(12) United States Patent
Boertjes et al.

(10) Patent No.: US 8,750,706 B2
(45) Date of Patent: Jun. 10, 2014

(54) SHARED PHOTONIC MESH

(75) Inventors: David Boertjes, Nepean (CA); Gerard Swinkels, Ottawa (CA); Serge Asselin, Kanata (CA); Ryan Amenta, Carleton Place (CA)

(73) Assignee: Ciena Corporation, Hanover, MD (US)

( * ) Notice: Subject to any disclaimer, the term of this patent is extended or adjusted under 35 U.S.C. 154(b) by 234 days.

(21) Appl. No.: 13/047,411

(22) Filed: Mar. 14, 2011

(65) Prior Publication Data

US 2011/0222846 A1    Sep. 15, 2011

Related U.S. Application Data

(60) Provisional application No. 61/313,172, filed on Mar. 12, 2010.

(51) Int. Cl.
*H04J 14/00* (2006.01)
*H04B 10/08* (2006.01)

(52) U.S. Cl.
USPC ........ 398/45; 398/1; 398/19; 398/48; 398/49; 398/50

(58) Field of Classification Search
USPC .................................................. 398/1, 43, 45
See application file for complete search history.

(56) References Cited

U.S. PATENT DOCUMENTS

| | | | |
|---|---|---|---|
| 2002/0186432 A1* | 12/2002 | Roorda et al. | 359/128 |
| 2004/0068626 A1* | 4/2004 | Alpert et al. | 711/158 |
| 2006/0008273 A1* | 1/2006 | Xue et al. | 398/51 |
| 2007/0036544 A1* | 2/2007 | Fukashiro et al. | 398/19 |
| 2008/0181605 A1* | 7/2008 | Palacharla et al. | 398/50 |

* cited by examiner

*Primary Examiner* — Oommen Jacob
(74) *Attorney, Agent, or Firm* — Kent Daniels; Daniels IP Services Ltd.

(57) ABSTRACT

A network element of an optical communications network. The network element comprises an electronic router for forwarding traffic between a set of client access ports and a plurality of I/O ports. A respective EO interface is coupled to each one of the plurality of I/O ports. Each EO interface terminates a respective optical channel. A directionally independent access (DIA) node is configured to selectively route each optical channel between its respective EO interface and a selected one of at least two optical fiber links of the optical communications network.

10 Claims, 5 Drawing Sheets

SHARED PHOTONIC MESH

CROSS-REFERENCE TO RELATED APPLICATIONS

This application is based on, and claims benefit of, U.S. Provisional patent Application No. 61/313,172, filed Mar. 12, 2010, the entire contents of which are hereby incorporated herein by reference.

MICROFICHE APPENDIX

Not Applicable.

TECHNICAL FIELD

The present invention relates generally to optical communication systems, and in particular to a Shared Photonic Mesh network.

BACKGROUND

Today's Fibre optic transmission systems are employing recent advances in optical switching technology to provide reconfiguration at the optical layer. The networks created in the photonic domain have evolved from simple point-to-point and ring architectures to more arbitrary topologies. That is to say that it is possible to redirect the individual channels within a dense wavelength division multiplexed (DWDM) system onto different transmission fibres. This is what is commonly referred to as the photonic mesh architecture.

One of the purported benefits of mesh architectures is the ability to more efficiently use network resources to provide resiliency. This is a well known benefit of internet protocol (IP) router architectures which lend themselves readily to such topologies. The corresponding increased reliance on more complex routing and switching nodes in the network drives more cost into these nodes.

The increase in use of optical switching promises to alleviate some of this additional cost by eliminating the need for multiple transponder interfaces. It is also desirable to keep the signals in the optical domain for as much of their transit distance in the system because of the inherent power efficiency of optical components. Optical components have power dissipation several orders of magnitude smaller than the equivalent functions in the electronic domain. However; it is a practical reality that optical switching, especially those which are cost effective and low power, have switching speeds several orders of magnitude slower than their electrical counterparts. Therefore, although there is a potential savings in cost (both capital and energy), there is a penalty in the performance of such an entirely optical network in terms of reconfiguration speed.

A motivation of this invention is to eliminate as many transponder interfaces as possible while maintaining overall system availability and keeping a low switching time for failure events.

There are different types of failures which may lead to the need to reconfigure the network. It is possible to categorize these in two groups. The first is span failures (which include fibre cuts, line amplifier failures, etc.) which make a link between the routers unavailable. The second is equipment failures at the routing nodes which make individual ports on the nodes unavailable. The first type of failure tends to be the dominant one in most long haul networks.

Two factors contribute to this fact. First, recent advances in transponder technology allow for the use of 1000's of km of fibre optic transmission in the optical domain with out the need for electrical regeneration. This elimination of electro-optical (EO) interfaces drives down the failures due to this equipment. In addition, network operators may find it difficult to repair broken fibres in some locations. Underwater cables are an example where it may take a long time for the fibre to be repaired in the case of a break. Also, it is costly to provide the level of service required to ensure a mean time to repair (MTTR) on fibre cable. It is much simpler to ensure a low MTTR for equipment located in the central office (CO).

Prior to the introduction of photonic switches, all reconfiguration had to be performed in the electronic domain. FIG. 1 shows an example of a network 2 where all switching/routing nodes are interconnected in a mesh fashion. In the illustration of FIG. 1, the network 2 is divided into an Internet Protocol/Multi-Protocol Label Switching (IP/MPLS) layer 4 and an optical transport layer 6. The optical transport layer 6 comprises the physical infrastructure of the network, and comprises physical switching nodes 8 (such as, for example, Reconfigurable Optical Add/Drop Multiplexers (ROADMs)) interconnected by DWDM optical channels 10 routed through optical fiber links 12. The IP/MPLS layer 4 comprises a respective router 14 for each physical switching node 8 of the optical transport layer 6, and provides path computation and protection switching for traffic flows through the network 2. Typically, each router provides electronic switching capacity between a set of client access ports (not shown) and a set of I/O ports connected to EO interfaces that transmit and receive optical signals through the optical transport layer 6 The IP/MPLS layer 4 typically represents each optical channel 10 as a connection 16 extending between a pair of electro-optical (EO) interfaces, and comprising working (W) and protection (P) transport capacity. For simplicity of illustration, each of the connections 16 corresponds with a respective fiber link 12 in the optical transport layer 6. However, it will be appreciated that this will frequently not be the case. For example, consider an optical channel 10 that extends through the optical transport layer 6 between nodes A and E, which passes through node B without terminating. In this case, corresponding connection 16 in the IP/MPLS layer 4 would extend directly between router A and router E, and bypass router B.

The IP/MPLS layer 4 ensures end to end survivability against all failures including optical layer equipment failures and network fiber cuts through the use of additional capacity. This "restoration capacity" is determined using off-line planning tools by running link failure analysis and/or engineered by keeping router trunk utilization below a threshold of 50%. The amount of restoration bandwidth determines the level of network survivability.

This type of network uses the same mechanism to protect the system against both span and equipment failures. This is inefficient, since there are many more EO interfaces in place to protect against span failures than are needed for equipment redundancy, especially at high-degree nodes (those with more than two directions intersecting at them).

Techniques which enable the elimination of as many transponder interfaces as possible while maintaining overall system flexibility and keeping a low switching time for reconfiguration events remain highly desirable.

SUMMARY

Accordingly, an aspect of the present invention provides a network element of an optical communications network. The network element comprises an electronic router for forwarding traffic between a set of client access ports and a plurality of I/O ports. A respective EO interface is coupled to each one of the plurality of I/O ports. Each EO interface terminates a respective optical channel. A directionally independent access (DIA) node is configured to selectively route each optical channel between its respective EO interface and a selected one of at least two optical fiber links of the optical communications network.

BRIEF DESCRIPTION OF THE DRAWINGS

Representative embodiments of the invention will now be described by way of example only with reference to the accompanying drawings, in which.

It will be noted that throughout the appended drawings, like features are identified by like reference numerals.

DETAILED DESCRIPTION

In very general terms, the present invention provides methods and systems in which shared electro-optic (EO) interfaces and optical switching technology are used to create a resilient mesh network with a minimum of redundant EO interfaces. This is particularly effective in networks where span availability is a major contributor to the system unavailability.

Figure 1:
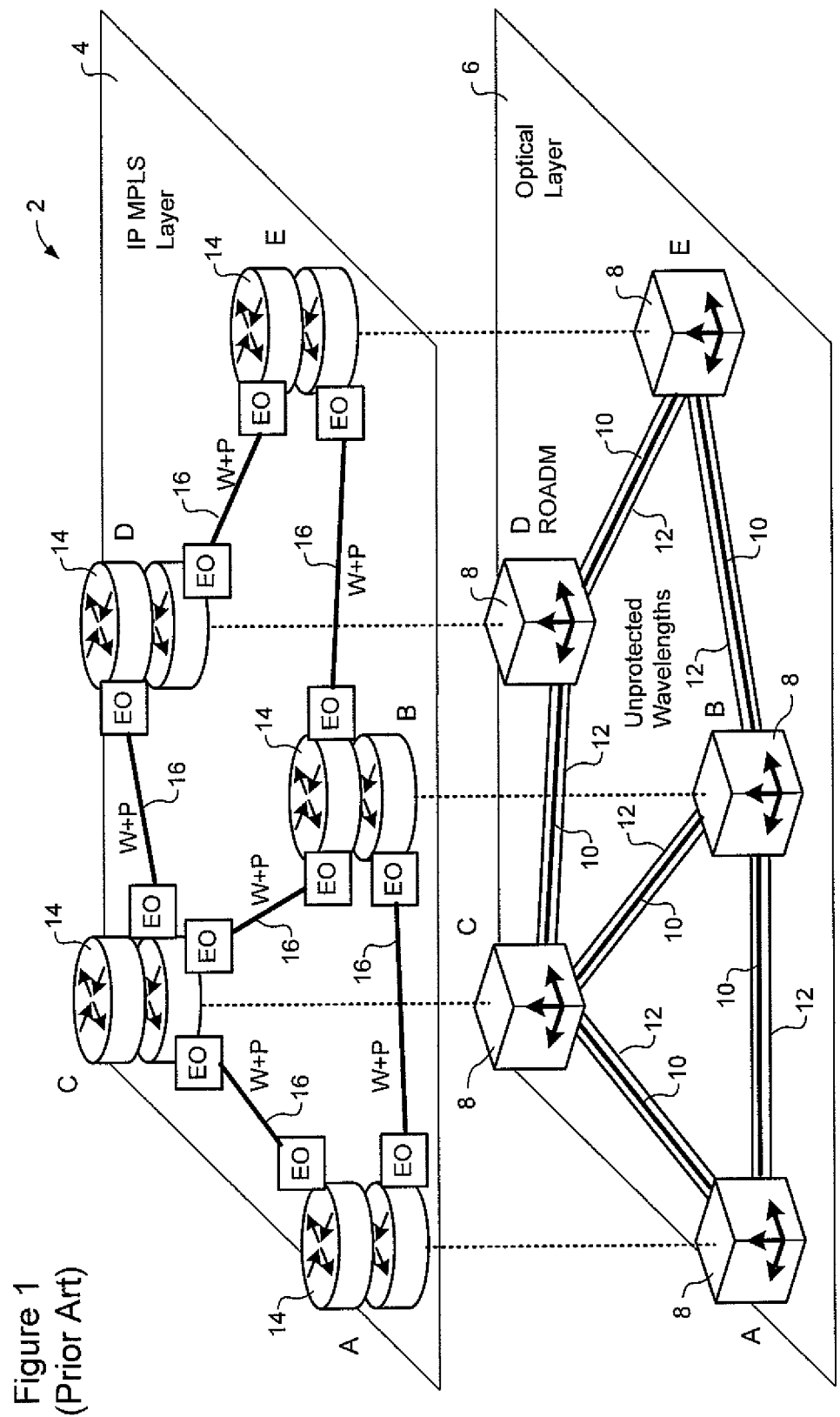
FIG. 1 is a block diagram schematically illustrating elements of a communications network utilizing electronic traffic switching and optical transport, known in the art.
Figure 2:
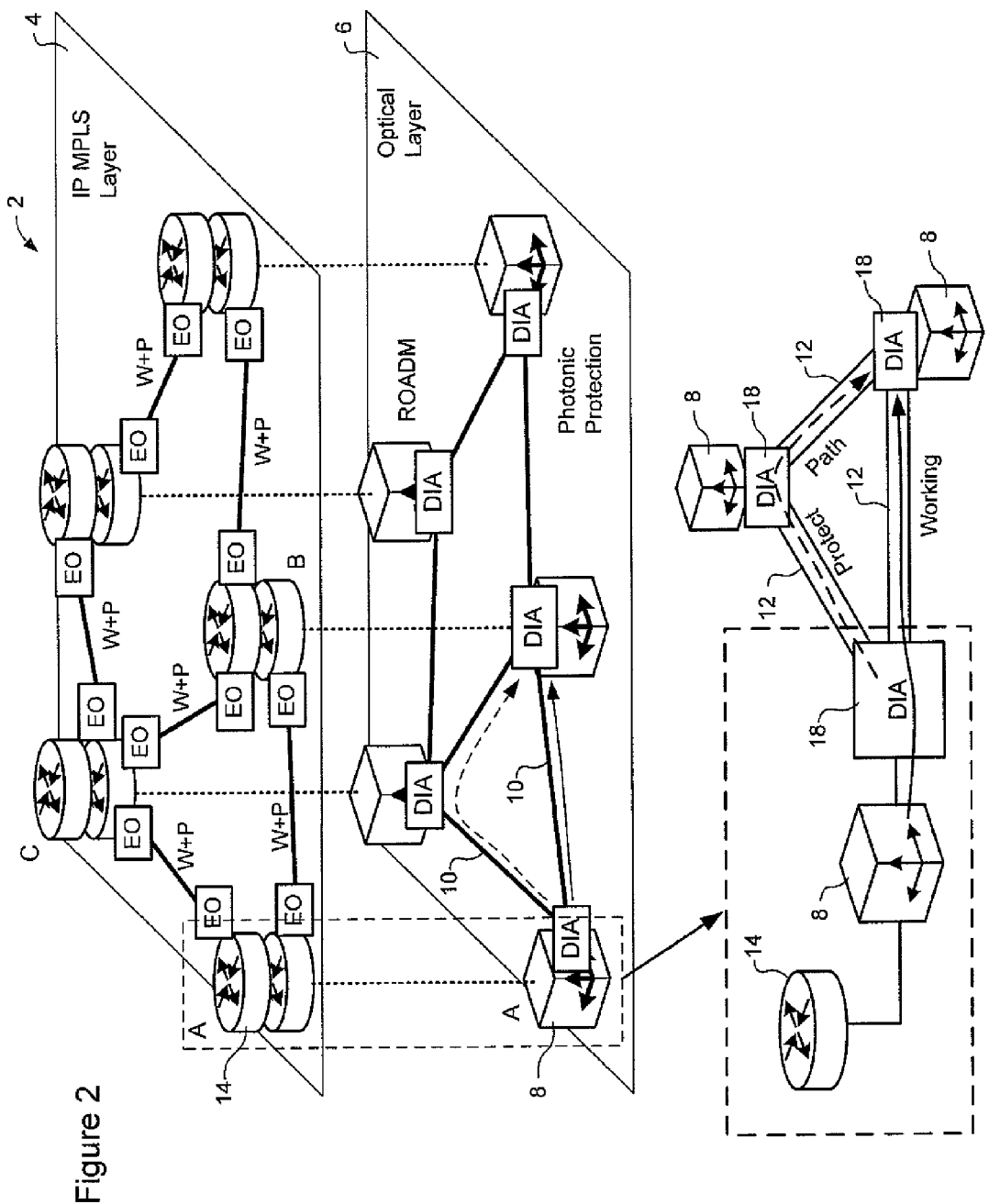
FIG. 2 is a block diagram schematically illustrating elements of a communications network communications network utilizing electronic traffic switching and optical layer restoration, in accordance with a representative embodiment of the present invention.

A first representative embodiment is shown in FIG. 2. Each node includes a conventional electronic router, which in this case is augmented with a directionally independent access (DIA) node 18 that provides colourless directionally independent access for all of the channels terminating at that location. This arrangement is also compatible with a ROADM where wavelengths can be reconfigured when transiting the node.

The DIA node 18 enables any optical channel 10 that terminates at the node to be routed through any fiber link 12 attached to the node. Therefore, it is not necessary for the node to have as many EO interfaces as there are channels supported by that node. Instead, the node can be configured with the minimum number of EO interfaces required to support client facing ports and to protect for router equipment failures. Span protection can be achieved by the optical reconfiguration of the DIA node 18. This is a two step process.

Figure 3:
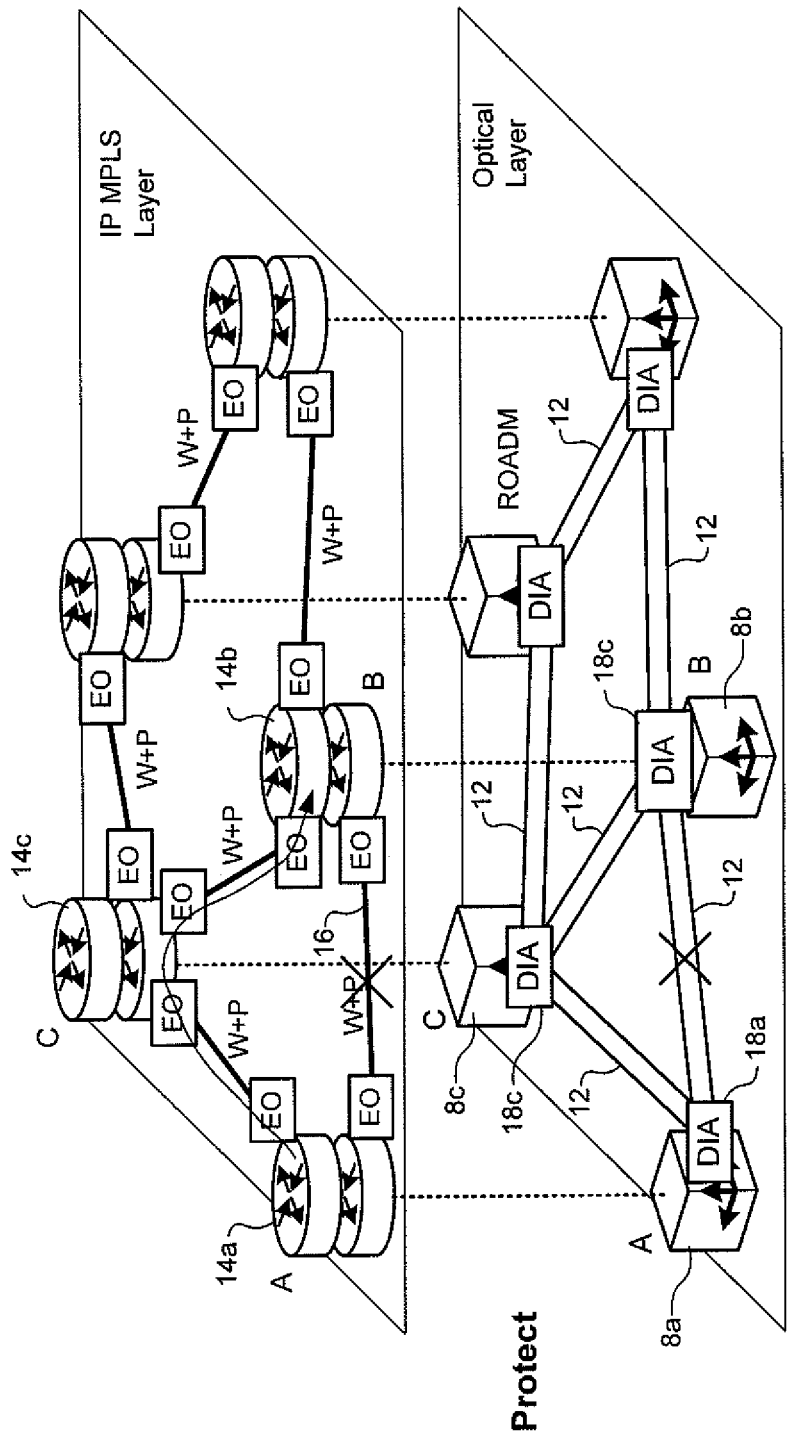
FIG. 3 is a block diagram schematically illustrating a first step in a protection/restoration process in accordance with a representative embodiment of the present invention, implemented in the network of FIG. 2.

FIG. 3 shows how the first step in system recovery to a span failure. In the scenario of FIG. 3, a span failure occurs on the fiber span we connecting nodes A and B in the Optical transport layer 6, indicated by an X in the drawing. The span failure is detected by the routers 14 in the IP-MPLS layer as a connection failure affecting the connection 16 between the affected routers 14a and 14b. In response to the detected connection failure, the routers A and B implement a conventional protection switching operation to electronically switch the affected traffic to designated protection capacity in the connections AC and CB, using a protection path that is either predetermined or computed following detection of the failure. As a result, the affected traffic flows are re-routed to pass through router C, which restores the traffic flow between routers A and B while bypassing the failed connection 16, and thus the failed fiber link 12.

As may be appreciated, this first switching event is handled entirely in the electronic domain (that is, in the IP/MPLS layer 4) which means that the system response time is very fast. However, the network is now in a state where it is vulnerable to a second failure, affecting either network equipment or a fiber span, which could cause an outage. Even without a second failure, the network links carrying the traffic switched from the failed link are now more heavily loaded, which leaves the network less resilient to peaks or bursts of traffic as are common to routed networks. The probability of a second failure occurring increases with the time spent in this condition. In the prior art, if the system doesn't have adequate additional bandwidth for multiple failures, one must take this time to be the MTTR for a span failure. On the other hand, this additional bandwidth drives cost in EO interfaces and in router/switch capacity.

Figure 4:
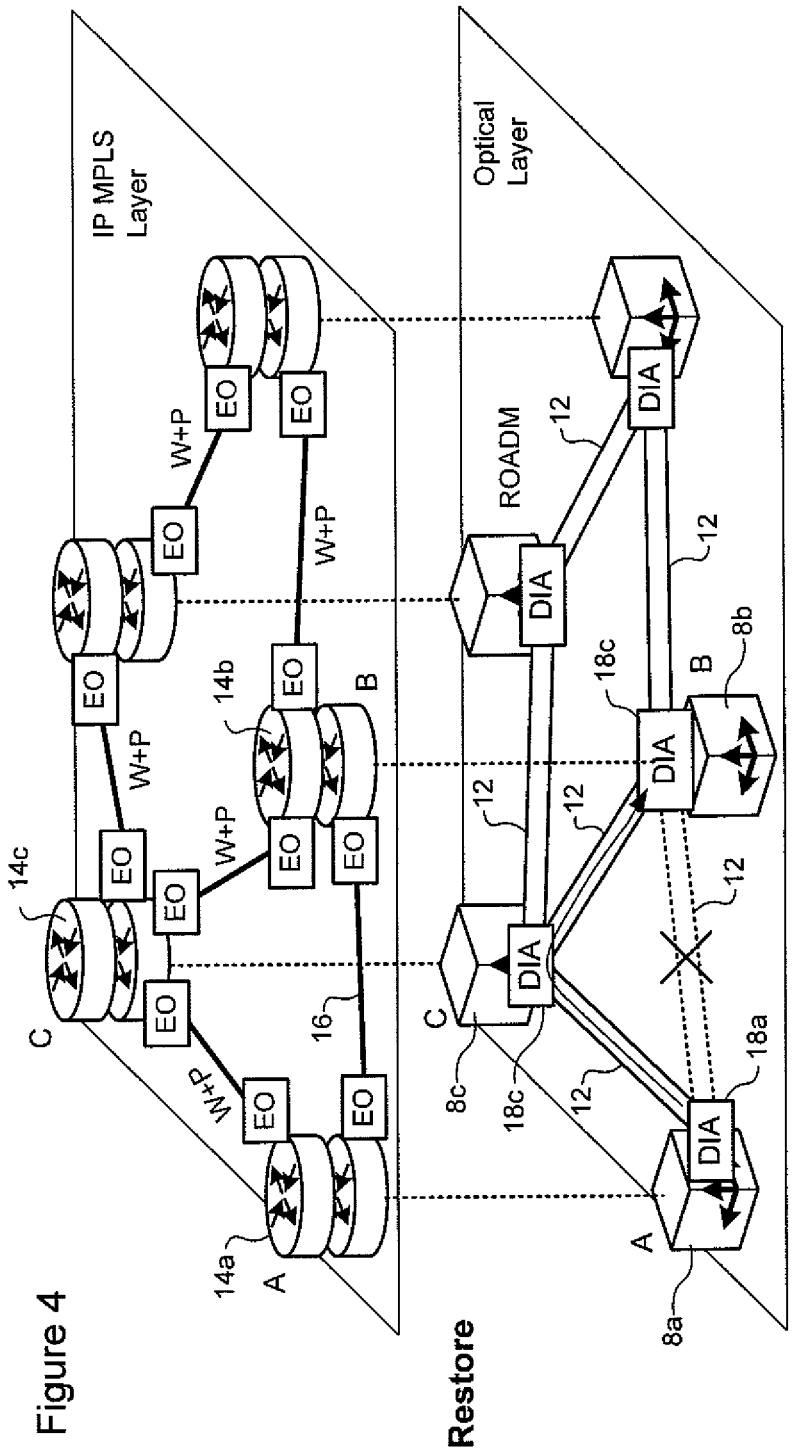
FIG. 4 is a block diagram schematically illustrating a second step in a protection/restoration process in accordance with a representative embodiment of the present invention, implemented in the network of FIG. 2.

The present invention avoids this problem by re-routing the EO interface which was facing the failed direction (fiber span) onto another fibre direction through the reconfiguration of the DIA nodes 18 as may be seen in FIG. 4. Thus, at nodes A and B, the EO interfaces that terminate optical channels 10 affected by the span failure are identified. The DIA nodes 18a and 18c are then reconfigured so that new optical channels can be set up between the identified EO interfaces, which traverse fiber links AC and CB, and pass through the DIA mode 18c at node C. The EO interfaces may be re-tuned to new channel wavelengths, as required to support the new channels 10. Once these new optical channels 10 have been set up and validated (in a conventional manner), they can be advertised to the IP/MPLS layer 4 a working connections between nodes A and B. As a result, routers 14a and 14b in the IP/MPLS layer recognise that the connection AB 16 has been restored, and so can switch the protection traffic back onto working transport capacity of that connection. One other interesting benefit of this approach, which should be evident from the FIGS. 3 and 4, is that the network topology presented to the IP/MPLS layer 4 remains the same before and after restoration. This is because the re-routed channels 10 pass through DIA node 18C without terminating at that node, and therefore appear as a direct connection 16 in the IP/MPLS layer 4.

Transport networks such as the type described above sometimes also have a sensitivity to the latency of the transport of data between the router ports which terminate any given connection. In some embodiments of the present invention there is provided a route calculation for the optical layer restoration, where the delay or latency is considered in the selection of the restoration path. In a system where the is a rich fibre interconnect and where there is an abundance of router bypass at the optical layer, there will often be photonic restoration paths which will have lower latency than the path that the data will take through the IP/MPLS restoration path. Thus, for example, a controller (which may be co-located with a node or at a central location, as desired) may compute two or more candidate routes through the optical transport layer 6 for the new channel, and estimate the latency for each route. based on this information, the controller may then select the best route (for example the route having the lowest latency) and set up the new channel over the selected route. This embodiment has the additional advantage of restoring not only the network to a pre-failure level of utilization and resiliancy, but it also restores it to a more comparable overall latency.

The two step process outlined above is beneficial in that the electrical protection switching step provides a rapid response to network failures, and then the second step enables the restoration of the protection-switched traffic back onto working transport capacity that bypasses the failed span. While a second fiber span failure could cause an outage, the probability of such an event is very much lower than the probability of a failure affecting IP/MPLS layer network equipment (such as EO interfaces, routers etc.). Consequently, this approach yields a very low "effective MTTR" which can dramatically improve the availability of the network as a whole.

Figure 5:
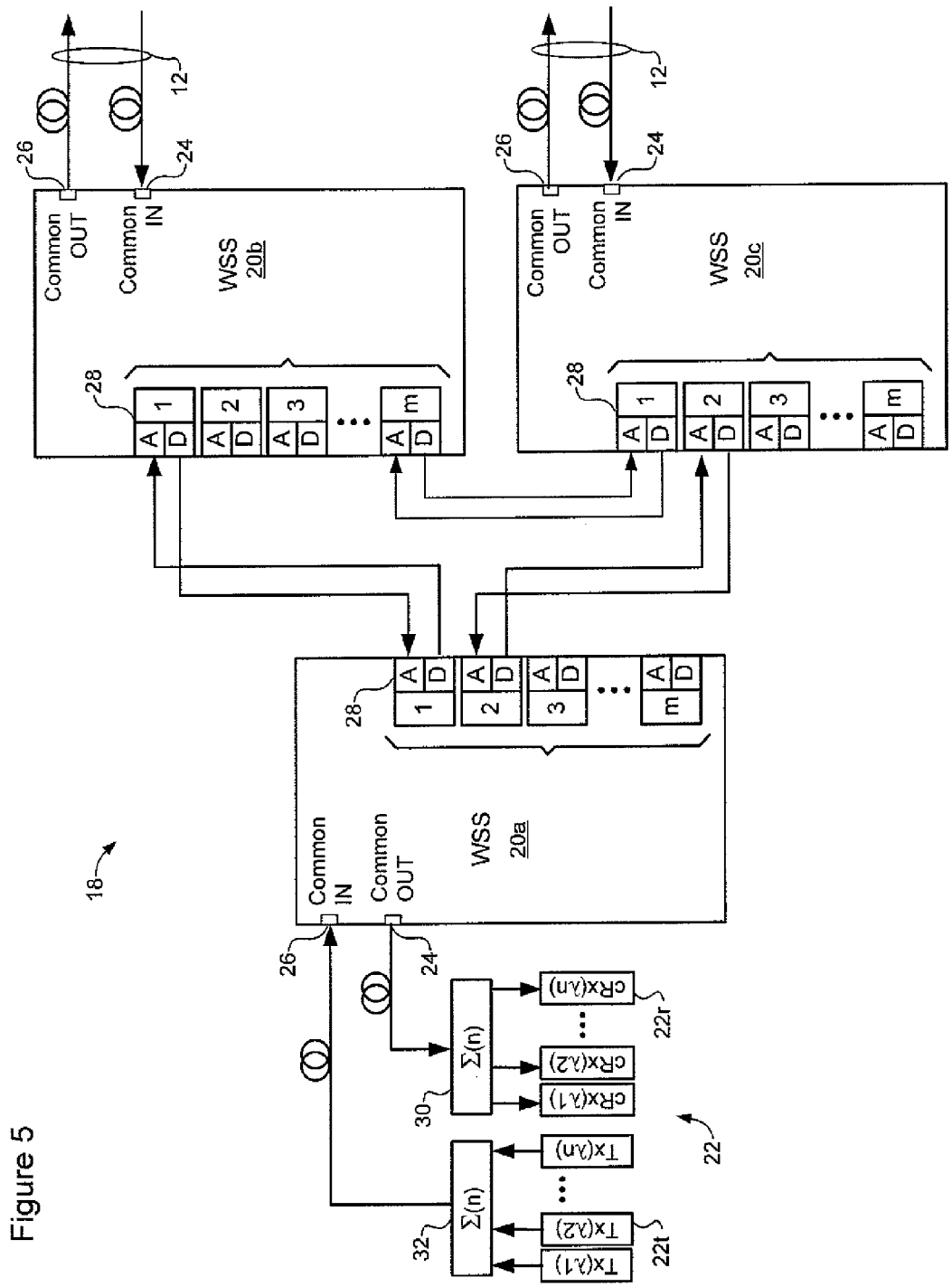
FIG. 5 is a block diagram schematically illustrating elements of a directionally independent access node in accordance with a representative embodiment of the present invention usable in the embodiments of FIGS. 2-4.

FIG. 5 schematically illustrates a possible directionally independent access (DIA) node 18 usable in the present invention. In the embodiment of FIG. 5, the DIA node 18 comprises a network of three Wavelength Selective Switches WSSs 20, which are interconnected between a set of EO interfaces 22, and two transmission fiber pairs defining respective bidirectional optical links 12 between the DIA node 18 and counterpart DIA nodes 18 connected to other nodes 8 of the network. Other configurations, which may provide interconnection to more than two transmission fibre pairs, are possible, and may be used, if desired.

As may be seen in FIG. 5, each WSS 20 includes a common-IN port 24, a common-OUT port 26 and set of m switch ports 28. Each switch port 28 comprises an Add port 28a and a Drop port 28b. In operation, the WSS 20 is designed to selectively switch any wavelength channel from the common-IN port to the Drop port of any one of the switch ports 28, and to selectively switch any wavelength channel received through the Add port of any given switch port 28 to either the common-OUT port 26 or to the Drop port of any one of the other switch ports 28. In the DIA node 18 of FIG. 5, a first WSS 20a hosts a set of EO interfaces 22 which terminate optical channels 10 being added or dropped at the node 8, and selectively switches these channels to the two branch Wavelength Selective Switches 20b and 20c, each of which is connected to a respective transmission fiber pair 12. With this arrangement, a wavelength channel received by one branch WSS (say, WSS 20b) through its common-IN port 24, can be selectively switched to either: the first WSS 20a, which can then switch the received channel through to a local OE interface 22; or the other branch WSS 20c, which can then switch the received channel through to its common-OUT port 26 for transmission to a neighbour node of the network. Conversely, a wavelength channel received by the first WSS 20a from a local OE interface 22 can be selectively switched to either one of the branch WSSs 20b,20c, which can then switch the received channel through to its common-OUT port. 26. for transmission to a neighbour node of the network.

In the embodiment of FIG. 5, the operation of the first WSS 20a and the local OE interfaces 22 is colourless, as described in Applicant's International patent application Serial No. PCT/CA2009/001455. Thus, in the illustrated embodiment, the common out port 26 is connected to a 1:n power splitter 30, which receives a set of dropped wavelength channels from the first WSS 20a and supplies these channels to each one of a corresponding set of s coherent receivers (cRx) 22r. Each coherent receiver (cRx) is preferably tuneable, so that it can receive a wavelength channel signal centered a desired carrier wavelength (or frequency). In some embodiments in which tuneable coherent receivers are used, the frequency range of each receiver 22r may be wide enough to enable the receiver to tune in any channel of the network. In other embodiments, the dynamic range of each receiver 22r may be wide enough to enable the receiver to tune in any one of a subset of channels of the network. In still other embodiments, each receiver may be non-tuneable. Each coherent receiver 22r must be designed having a CMRR which enables the receiver to tune in and receive a selected one channel while rejecting each of the other channels presented to it. Conversely, a 1:n power combiner 32 is used to combine channel signals generated by a respective set of transmitters (Tx) 22t, and supply the resulting wavelength division multiplexed (WDM) signal to the common in port 24 of WSS 20a. Preferably, each transmitter (Tx) 22t is tuneable, so that it can generate a wavelength channel signal centered on a desired carrier wavelength (or frequency). In some embodiments in which tuneable transmitters are used, the dynamic range of each transmitter (Tx) 22t may be wide enough to enable the transmitter (Tx) 22t to generate any channel of the network. In other embodiments, the dynamic range of each transmitter (Tx) 22t may be wide enough to enable the transmitter (Tx) t22 to generate any one of a subset of channels of the network. In still other embodiments, each transmitter (Tx) 22t may be non-tuneable. It should be noted that while only a single set of 1:n power splitters and combiners is described herein, there are other embodiments with combinations of WSS stages combined with power splitter and combiner stages which can support more channels in a colorless fashion, the details of which are described in the referenced international patent application.

As noted above, in the embodiment of FIG. 5, the EO interfaces 22 are connected to the common-IN and common-OUT port 26, 24 if the first WSS 20a. However, it will be appreciated that this is not essential. In fact, those of ordinary skill in the art will recognise that EO interfaces 22 may be connected to one or more of the switch ports 28, either alone or in combination with EO interfaces 22 connected to the common ports 24 and 26.

In the foregoing description, the present invention is described with reference to a representative embodiment in which electronic traffic routing functionality is provided by an IP/MPLS layer. However, it will be appreciated that this is not essential. In fact, the techniques of the present invention can be implemented in any network in which a connection-oriented electronic traffic routing layer is over-laid on an optical transport layer. Thus, for example, in alternative embodiments, the electronic traffic routing layer may be implemented using an Ethernet technology, without departing from the scope of the present invention.

Although the invention has been described with reference to certain specific embodiments, various modifications thereof will be apparent to those skilled in the art without departing from the spirit and scope of the invention as outlined in the claims appended hereto.

We claim:

1. A method of controlling a communications network including an electronic traffic routing layer and an optical transport layer, the method comprising:
routers of the electronic traffic routing layer detecting a connection failure, and electronically switching traffic flows affected by the connection failure to a protection path in the electronic traffic routing layer;
when the detected connection failure is due to a span failure in the optical transport layer, a controller identifying EO interfaces terminating an optical channel affected by the span failure, reconfiguring directionally independent access (DIA) nodes connected to the failed span, and setting up a new optical channel through the optical transport layer between the identified EO interfaces; and the routers of the electronic traffic routing layer recognising the new optical channel as a restored connection in the electronic traffic routing layer; and electronically switching traffic flows from the protection path to the restored connection.

2. The method as claimed in claim 1, wherein the protection path in the electronic traffic routing layer is a predetermined protection path.

3. The method as claimed in claim 1, wherein the protection path in the electronic traffic routing layer is computed following detection of the connection failure.

4. The method as claimed in claim 1, wherein setting up the new optical channel through the optical transport layer comprises computing a route for the new optical channel that minimizes latency between the identified EO interfaces.

5. The method as claimed in claim 1, wherein setting up the new optical channel through the optical transport layer comprises:
   computing two or more candidate routes through the optical transport layer between the identified EO interfaces;
   computing a respective latency for each candidate route;
   selecting the candidate route having a computed latency that most closely matches that of the optical channel affected by the span failure; and
   setting up the new channel using the selected candidate route.

6. The method as claimed in claim 1, wherein a route for the new optical channel differs from that of the protection path in the electronic traffic routing layer.

7. An optical communications network comprising:
   a plurality of network elements, each network element comprising:
      an electronic router coupled to a set of client access ports and a plurality of I/O ports, the electronic router for forwarding traffic between the set of client access ports and the plurality of I/O ports;
      a respective EO interface coupled to each one of the plurality of I/O ports, each EO interface terminating a respective optical channel; and
      a directionally independent access (DIA) node for selectively routing each optical channel between its respective EO interface and a selected one of at least two optical fiber links of the optical communications network, the (DIA) node comprising:
         a first wavelength selective switch (WSS) having at least one port optically connected to the EO interfaces; and
         a respective branch WSS optically connected to each optical fiber link and the first WSS;
         the first WSS configured to selectively route optical channels between the EO interfaces and a selected branch WSS, and each branch WSS configured to selectively route optical channels between its respective optical fiber link and the first WSS;
      each electronic router being configured to:
         detect a connection failure, and electronically switch traffic flows affected by the connection failure to a predetermined protection path; and
         detect restoration of a previously failed connection, and electronically switch traffic flows affected by the connection failure from the predetermined protection path to the restored connection;
      a controller responsive to a span failure affecting an optical fiber link to:
         identify EO interfaces terminating an optical channel affected by the span failure;
         reconfigure directionally independent access (DIA) nodes connected to the failed span, and
         set up a new optical channel through the optical transport layer between the identified EO interfaces.

8. The network as claimed in claim 7, wherein the controller is further configured to compute a route for the new optical channel that minimizes latency between the identified EO interfaces.

9. The network as claimed in claim 7, wherein the controller is further configured to:
   compute two or more candidate routes through the optical transport layer between the identified EO interfaces;
   estimate a respective latency for each candidate route;
   select the candidate route having a lowest computed latency; and
   set up the new channel using the selected route.

10. The network as claimed in claim 7, wherein each EO interface is tuneable to a desired optical wavelength channel.

\* \* \* \* \*